United States Patent [19]
Georgoudis et al.

[11] 3,926,920
[45] Dec. 16, 1975

[54] HOT MELT ADHESIVE BASED ON LOW VISCOSITY HEAT STABLE COPOLYESTERS

[75] Inventors: Paul C. Georgoudis, Dunellen; Dilip K. Ray-Chaudhuri, Somerville; Thomas P. Flanagan, Green Brook, all of N.J.

[73] Assignee: National Starch and Chemical Corporation, Bridgewater, N.J.

[22] Filed: Dec. 20, 1974

[21] Appl. No.: 534,725

Related U.S. Application Data

[63] Continuation-in-part of Ser. No. 337,638, March 2, 1973, abandoned.

[52] U.S. Cl. ............... 260/75 R; 156/332; 260/40 R
[51] Int. Cl.² ........................................ C08G 63/16
[58] Field of Search .................. 260/75 R; 156/332; 161/226

[56] References Cited
UNITED STATES PATENTS

| | | | |
|---|---|---|---|
| 2,824,821 | 2/1958 | Nischk et al. | 156/332 X |
| 3,136,677 | 6/1964 | Woker | 260/75 R X |
| 3,484,339 | 12/1969 | Caldwell | 156/332 X |
| 3,505,293 | 4/1970 | Bond et al. | 260/75 R |
| 3,682,863 | 8/1972 | McHale | 260/75 R |
| 3,699,187 | 10/1972 | Gardziell | 156/332 X |

OTHER PUBLICATIONS

Hill, et al. *J. Polymer Science,* 3(5), (1948) 609–629.

Mark, et al. *Man-Made Fibers,* Science and Technology, Interscience Publishers, Vol. 3 (1968) pp. 74 & 75.

*Primary Examiner*—Donald E. Czaja
*Assistant Examiner*—W. C. Danison, Jr.
*Attorney, Agent, or Firm*—Thomas B. Graham

[57] ABSTRACT

Novel hot melt adhesive compositions are disclosed comprising copolyesters obtained by reacting at least one glycol having 2–6 carbon atoms with a mixture of phthalic acids or their dicarboxylic acid functioning derivatives or combinations thereof.

5 Claims, No Drawings

HOT MELT ADHESIVE BASED ON LOW VISCOSITY HEAT STABLE COPOLYESTERS

RELATED APPLICATION

This application is a continuation-in-part of our co-pending application Ser. No. 337,638 filed Mar. 2, 1973 and assigned to the assignee of the instant application, now abandoned.

BACKGROUND OF THE INVENTION

This invention relates to novel hot melt adhesives based on selected copolyesters. More particularly, this invention relates to hot melt adhesives characterized by their unusually low melt viscosities and improved resistance to thermal degradation.

Hot melt adhesives are solid combinations of film forming resins, tackifying resins, rubbery polymers, plasticizers waxes and similar materials which may be added to the composition in order to develop various desired properties. Hot melt adhesives are bonding compositions which achieve a solid state and resultant strength by cooling as contrasted with other adhesives, such as emulsion or lacquer adhesives, which achieve the solid state through evaporation or removal of solvent. A hot melt is a thermoplastic material which is in the form of a 100%, by weight, solid. Application of heat melts the solid hot melt and, after removal of the heat source, it sets by simple cooling. This is in direct contrast to thermosetting adhesives which set or harden by the application of heat and which remain hard upon continued application of heat.

Hot melt adhesives are widely used in packaging, shoe manufacturing, and other industries and are particularly useful because of their tackiness in the molten state and the speed with they form strong bonds. However, utilization of these combinations is, at times, limited because of certain undesirable properties which adversely affect their overall performance. For example, high melt viscosity makes the adhesives hard to apply to the surface of the substrate, and poor heat stability results in thermal degradation.

In order to yield satisfactory results in commercial usage, hot melt adhesive compositions must possess several other properties, in addition to the necessary degree of tackiness at the application temperature. In particular, these compositions must display a low viscosity at the application temperature so as to easily wet the surface of the substrate and also possess heat stability to minimize molecular degradation due to prolonged heating, oxidation, and hydrolysis.

Heretofore, various remedies for the aforementioned problems inherent in hot melt adhesives have been tried with limited success. Decreasing the viscosity by prolonged heating or using an application temperature substantially above the melting point of the polyester have proven quite futile, since these methods cause thermal degradation.

Thus, it is the prime object of this invention to provide copolyester hot melt adhesives having low melt viscosities and improved wetting characteristics without detracting from any of the other properties which are ordinarily necessary in such adhesives.

A further object of this invention is to provide a class of copolyesters which exhibit unusually high resistance to thermal degradation and are useful as hot melt adhesives.

A still further object of this invention is to provide copolyesters characterized by their low melt viscosities and good adhesive properties which can be applied by conventional equipment utilized in the hot melt adhesive industry.

Various other objects and advantages of this invention will become apparent to the practitioner from the following description thereof.

We have now discovered that hot melt adhesive compositions characterized by their low melt viscosities and great resistance to thermal degradation can be prepared employing copolyesters comprising residues derived from A. at least one aliphatic primary dihydric alcohol having 2-6 carbon atoms and B. the following dicarboxylic acids: terephthalic acid, isophthalic acid, and phthalic acid;

Said part A component being chosen such that the copolyester has a melting point no greater than 150°C.

According to this invention the novel copolyesters are obtained by reacting the two essential components. Said components are (1) the glycol portion comprised of at least one dihydric-primary alcohol containing from 2-6 carbon atoms and having the characteristic glycol structure and (2) the dicarboxylic acid functioning portion comprised of mixtures of the phthalic acids or their acid-functioning derivatives.

The glycol component may comprise a single diol, used individually, or two or more suitable diols in combination. Among the suitable diols useful herein are included the following: 1, 2-ethanediol, 1, 3-propanediol, 1, 4-butanediol, 1, 6-hexanediol, and neopentyl glycol. These compounds and those others which may obviously be used for the purpose embodied herein are commercially available.

Regardless of whether a single diol or a combination of two or more diols is used, the alcohol component must be selected so that the polyester has a melting point no greater than 150°C. For the purposes of this invention, it is preferred that 1, 4-butanediol or 1, 6-hexanediol or combinations of these with ethylene glycol or neopentyl glycol be used.

The dicarboxylic acid functioning components comprise mixtures totaling 100 mole per cent of the following dicarboxylic acids or their dicarboxylic acid functioning derivatives: 25–65 mole per cent of terephthalic acid, 25–65 mole per cent of isophthalic acid, and 5–20 mole per cent of phthalic acid or its anhydride. Among the suitable derivatives of said acids useful herein are included their dimethyl and diethyl esters, e.g., dimethyl terephthalate, diethyl terephthalate, dimethylisophthalate, diethylphthalate, etc., the acyl halides of said acids, e.g., terephthaloyl chloride, isophthaloyl chloride, isophthaloyl bromide, and the phthaloyl halides, etc. These compounds are also commercially available.

The procedure for preparing these novel copolyester hot melt adhesives involves the three step operation consisting essentially of (1) transesterification of a terephthalic acid ester with the dihydric alcohol, (2) direct esterification of the transesterification product with isophthalic acid, phthalic acid or its anhydride, and (3) polycondensation of the alcohol ester thus formed in the presence of a catalyst at high temperatures. The transesterification and direct esterification steps are preferably carried out in an inert atmosphere, and in the presence of salt catalysts. Such techniques require overall reaction temperatures ranging from about 180°–290°C. over a period of at least 4 hours. The actual temperature range and duration of the reaction will depend considerably on the reactants and catalysts used. The extent of polycondensation of the alcohol ester will depend on the desired molecular weight of the copolyester. Alternately, these copolyesters may be prepared directly from the three aforementioned phthalic acids or their dialkyl esters depending on availability and ease of handling. Typical melt polymerization techniques involving transesterification reactions are described by Whinfield et al., U.S. Pat. No. 2,465,319 and, inter alia, Snyder, U.S. Pat. No. 2,623,031.

Additional information relating to the preparation of similar copolyesters may be obtained from "Polymers and Resins", by B. Golding, D. Van Nostrand Co., Inc., (1959) P.283–9.

With regard to proportions, the alcohol portion of the mixtures reacted to form the copolyesters of the hot melt adhesives herein should be in sufficient amount to ensure complete transesterification. For this reason, it is ordinarily advantageous to utilize an alcohol portion in excess of the stoichiometric amount. The dicarboxylic acid functioning portion comprising the mixture totaling 100 mole per cent of the three phthalic acids or their respective dicarboxylic functioning derivatives or combinations thereof should comprise from 25–65 mole per cent of terephthalic acid, from 25–65 mole per cent of isophthalic acid, and 5–20 mole per cent of phthalic acid. Since the particular starting materials and the amounts used, as well as the reaction conditions will dictate the structure and properties of the resulting copolyester, the selection of the specific ingredients and their concentrations will be left to the discretion of the practitioner.

In the practice of this invention, it is preferred that dicarboxylic acid functioning components comprising from 30–50 mole per cent of terephthalic acid, from 30–50 mole per cent of isophthalic acid, and from 5–15 mole per cent of phthalic acid or its anhydride be used.

The resulting hot melt adhesive composition can be drawn off and may be used immediately in hot pots in the manner to be described hereinbelow. It may also be molten-extruded into rope form or converted into pellets, rods, cylinders, slugs or billets, or it may be granulated or diced depending upon the equipment which will subsequently be used to apply the hot melt. As another alternative, the freshly prepared adhesive may be placed into cooling pans and held in bulk form for later use.

Optionally, the adhesive may be coated onto a conventional silicone-coated release paper and stored until needed at which time the adhesive film can be stripped from the release paper and applied to a selected substrate.

When the adhesive of this invention are activated by heating to a temperature above their melting points they become tacky and capable of forming adhesive bonds.

Although the copolyesters of this invention are satisfactory hot melt adhesives in themselves, conventional additives may be incorporated, if desired, to modify certain properties of the films cast therefrom. Conventional additives or diluents such as tackifying resins, plasticizers, stabilizers or colorants may be used.

Fillers such as are commonly employed as loading agents in adhesives, may also be added to the adhesives of this invention, if desired. Examples of such fillers include clay, talc, silica, calcium carbonate, and the like. The fillers can be added at any time during the preparation of the adhesives, and mixtures of two or more fillers may also be used.

All of the novel hot melt adhesives of this invention may be utilized in a wide variety of applications such, for example, as adhesives for natural and synthetic fabrics used in clothing, paper and cardboard used for containers, etc.

The actual application of the hot melt adhesives of this invention may be accomplished by the use of any conventional hot melt equipment. Ordinarily, the adhesive is first premelted in an applicator pot which is at a temperature of about 300°–400°F. An applicator roll or extrusion nozzle can then be used to apply either an overall coating or a patterned strip or a continuous bead of the adhesive to any desired substrate; the film coating should have a final dry thickness of from about 0.5–4.0 mils. The thus coated substrate should then be immediately applied or transferred to the surface of the substrate to which it is to be adhered. As the adhesive coating cools down to room temperature, the bonding process will be completed.

The following examples will further illustrate the embodiments of this invention. In these examples all concentrations are given as parts, by weight, unless otherwise specified.

EXAMPLE 1

This example illustrates the preparation of a novel hot melt adhesive using a copolyester derived from the reaction of two dicarboxylic acids, the anhydride of a dicarboxylic acid, and 1, 4-butanediol. In this case a three step polyesterification process was employed as follows:

Step 1 — Into a 2 liter reactor, mounted in an oil bath and equipped with a mechanical stirrer, a nitrogen inlet, an 18 inch Vigreux column-distillation head with a thermometer, a Dean and Stark trap (20 ml capacity), and condenser, there were introduced the following ingredients:

| Ingredient | Amount |
| --- | --- |
| Dimethyl terephthalate | 194 (50 mole per cent) |
| Dimethyl isophthalate | 155 (40 mole per cent) |
| 1,4-Butanediol | 360.0 |
| Zinc acetate dihydrate | 0.22 |
| 4,4'-thiobis(6-tert-butyl-m-cresol) | 0.11 |

The temperature was gradually raised to and maintained at 230°C, as the above ingredients were thoroughly mixed in a nitrogen atmosphere for about 4.5 hours to ensure complete transesterification. The methanol and a small quantity of tetrahydrofuran collected in the distillation trap were discarded.

Step 2 — Thereafter the contents of the reactor were cooled to 170°C. and 29.6 parts (10 mole per cent) of phthalic anhydride, 0.22 parts of antimony trioxide, and 27 parts of xylene were added. Then the temperature was raised to and maintained at 230°C. as the mixture was slowly stirred in a nitrogen atmosphere until an acid number of about 2 was indicated.

Step 3 — The pressure was then gradually reduced to between 0.20–0.40 mm. of mercury, and the temperature was raised to and maintained at 275°C., while polymerization was continued for 3.5 hours. A fluid-tacky copolyester having a slightly gray color was obtained. Upon testing a solidified portion of this copolyester by means of a Du Pont Model No. 900 Differential Thermal Analyzer, it was determined that its melting point was 120°C. Thereafter duplicate samples of said copolyester were subjected to several different tests to evaluate its various properties as set forth below.

The averages of the results from each of the duplicate samples tested were compared to those similarly obtained with a control adhesive composition. The latter composition comprised a copolyester derived by reacting terephthalic acid and isophthalic acid each at 50 mole per cent with 1,4-butanediol. In all of the following tests, duplicate samples were run. The results obtained therefrom are reported in Table No. 1 below as the averages of said duplicate samples.

A. Melt Viscosity: To determine melt viscosity, a 13.2 gram sample of the copolyester was heated to 400°F, and a measurement, using a Brookfield Thermocel RVT Viscometer with a No. 27 spindle, was taken. Said measurement at the prescribed temperature is reported as Melt Viscosity in terms of centipoises (cps) hereinafter.

B. Thermal Stability Test: To evaluate the ability of the copolyesters herein to resist thermal degradation, intrinsic viscosity (I.V.) determinations were made before and after heating the copolyester. The I.V. determinations were made according to the method described in "Principles of Polymer Chemistry," 7, 309–310, using a Cannon-Fenske capillary viscometer (size 100) and 1,1,2,2,-tetrachloroethane (TCE) as a solvent. Viscosity measurements of each sample were made at concentrations of 0.5, 1.0, and 1.5 grams of the copolyester per 100 milliliters of the solvent. Following the initial I.V. determination, a beaker containing 20 grams of the copolyester was stored in an oven at 400°F. for 72 hours, after which a final I.V. determination was made. The I.V. determinations are reported as deciliters per gram (dl/gm). Thermally stable copolyesters show a relatively small decrease in I.V.

C. Adhesion Test: To evaluate the effectiveness of the adhesive, measurements of bond strength of bonded cotton sandwiches before and after washing and of bonded rayon sandwiches before and after dry cleaning, were made.

The copolyester tested for its adhesiveness was used as a film prepared by drawing down a portion of the molten copolyester (about 425°F) on a preheated 8 × 10 inch teflon coated metal plate with a heated Bird applicator to a 3 mil thickness. Then one of two film strips ¼ × 4 inches each, was placed between two 1 × 5 inch pieces of cotton and the other film strip between two pieces of rayon of the same dimensions. The sandwich employing the cotton was then sealed by heating it at 300°F under 10 psi for 1 second, and that employing the rayon was similarly sealed, except for the pressure was 5 psi. The bonded sandwiches were stored for 16 hours and then the adhesiveness of each sample was tested, using an Instron Tensile Tester. The bond measurements are reported as Initial Adhesion in terms of force per linear inch, e.g., pounds per inch or grams per inch (lbs./in. or gm./in.).

D. Wash Resistance: The bonded cotton sample was subjected to a washing process designed to simulate that of a conventional automatic washer. Herein the sample was held in a 2 per cent detergent solution which was agitated at 160°F for 1 hour. Then the sample was rinsed in cold water and dried at room temperature for 16 hours prior to testing the adhesive bond on the Instron. The bond measurements are accordingly reported as "Washed" in terms of lbs/in.

E. Dry Clean Resistance: The bonded rayon sample was subjected to continuous tumbling in an organic solvent cleaning process more intense than, but designed to simulate, that utilized in commercial dry cleaning. In carrying out this test procedure, the sample was immersed in perchloroethylene contained in a one quart jar mounted on a tumbler. The jar was rotated at 20 rpm for 1 hour whereupon the solvent soaked sample was removed from the jar and dried at room temperature for 16 hours. The bond strength of the dried sample was then measured on the Instron. The bond strength measurements are accordingly reported as "Drycleaned" in terms of gms/in.

The averaged results of all of the above tests are summarized in Table No. 1 below. As indicated by the results, the copolyester tested displayed an unusually high resistance to thermal degradation and was useful as a hot melt adhesive for natural and synthetic fabrics.

Table No. 1

| Material Tested | Melt Viscosity (CPS at 400°F.) | Heat Stability (I.V.-1,1,2,2-TCE) | | | Adhesion Cotton (lbs/in) | | Rayon (gms/in) | |
|---|---|---|---|---|---|---|---|---|
| | | Initial | Final | Change | Initial | Washed | Initial | Drycleaned |
| Sample I | 15,500 | 0.412 | 0.327 | 0.085 | 24.5 | 11.8 | 1,780 | 760 |
| Control | 65,000 | 0.520 | 0.250 | 0.270 | 24.4 | 10.0 | 1,400 | 860 |

EXAMPLES II–IV

These examples illustrate the preparation of a series of novel copolyester hot melt adhesives in accordance with this invention. The copolyesters were obtained by reacting 1,4-butanediol with mixtures of dicarboxylic acids and derivatives at varied concentrations.

To make the series of sample copolyesters, II–IV and a control, the procedural steps of Example 1 were repeated using similar catalysts under the same conditions, except the respective formulations were as set forth in the chart below. The formulation of said control was based on that of a commercially available adhesive composition.

| Ingredient | Sample No. and Amount | | | |
|---|---|---|---|---|
| | II | III | IV | Control |
| Dimethyl terephthalate | 194.0 | 194.0 | 194.0 | 97.0 |
| Phthalic anhydride | 14.8 | 44.4 | 59.2 | — |
| Isophthalic acid | 149.3 | 116.2 | 99.6 | 83.0 |
| Dimethyl isophthalate | — | — | — | — |

-continued

| Ingredient | II | Sample No. and Amount III | IV | Control |
|---|---|---|---|---|
| 1,4-Butanediol | 288.0 | 288.0 | 288.0 | 288.0 |

In each case, a molten fluid-like and tacky copolyester similar to that prepared in Example 1 was obtained. Portions of each of these copolyesters were then set aside and allowed to solidify for melting point determinations. The results were as follows:

| Sample No. | Melting Point (°C) |
|---|---|
| II | 120 |
| III | 117 |
| IV | 120 |
| Control | 140 |

Portions of the remaining copolyester samples were then subjected to the melt viscosity, heat stability, adhesive and cleaning tests described in Example 1, supra. The various tests results are summarized in Table No. 2 below.

Table No. 2

| Material Tested | Melt Viscosity (CPS at 400°F.) | Heat Stability (I.V.-1,1,2,2-TCE) Initial | Final | Change | Adhesion Cotton (lbs/in) Initial | Washed | Rayon (gms/in) Inital | Drycleaned |
|---|---|---|---|---|---|---|---|---|
| Example II | 29,250 | 0.480 | 0.265 | 0.215 | 25.5 | 12.6 | 1,090 | 450 |
| Example III | 20,250 | 0.378 | 0.290 | 0.088 | 16.7 | 8.3 | 960 | 530 |
| Example IV | 16,375 | 0.400 | 0.300 | 0.100 | 24.0 | 11.6 | 1,225 | 610 |
| Control | 65,000 | 0.520 | 0.250 | 0.270 | 24.4 | 10.0 | 1,400 | 860 |

Based on the above data, it is thus seen that though the cotton adhesion of the control was comparable to those of a few of the test samples, the melt viscosity and heat stability properties throughout the entire test sample series were far superior to those of the control.

EXAMPLE V

This example illustrates another hot melt adhesive of this invention.

In this instance, 60 mole per cent of the particular dicarboxylic acid was employed in combination with a second dicarboxylic acid and phthalic anhydride as described below.

To make the instant adhesive composition, the procedural steps of Example 1 were repeated, except herein the reactants and their respective concentrations were as follows:

| Ingredient | Amount |
|---|---|
| Dimethyl terephthalate | 233.0 |
| Isophthalic acid | 99.6 |
| 1,4-Butanediol | 298.0 |
| Phthalic anhydride | 29.6 |

A product similar to that prepared in Example 1 was obtained. It was determined that this copolyester had a melting point of 147°C. Furthermore, it was observed that when subjected to the various tests employed in the above referred to example, the product herein also exhibited the low melt viscosity, good heat stability, and adhesion properties which were substantially improved over those of a well known commercial adhesive.

EXAMPLE VI

This example illustrates the usefulness of an additional single diol as the glycol component in the preparation of a novel hot-melt adhesive in accordance with this invention.

To make the instant adhesive composition, the procedural steps employed in Example 1 were repeated, using the following reactants at their respective concentrations:

| Ingredient | Amount |
|---|---|
| Dimethyl terephthalate | 194.0 |
| Isophthalic acid | 132.8 |
| Phthalic anhydride | 29.6 |
| 1,6-Hexanediol | 377.0 |

The adhesive composition described above had a melting point of 75°C. and exhibited low melt viscosity, good heat stability, and adhesive properties comparable to those of the product obtained in Example 1.

EXAMPLES VII–IX

These examples illustrate the usefulness of alcoholic components containing two glycols in the preparations of hot melt adhesives in accordance with this invention.

The detailed procedure set forth in Example 1 was again employed to make the adhesive compositions having the following formulations:

| Ingredients | VII | Example No. VIII | IX |
|---|---|---|---|
| Dimethyl terephthalate | 116.2 | 155.1 | 155.1 |
| Isophthalic acid | 199.0 | 166.0 | 166.0 |
| Phthalic anhydride | 29.6 | 29.6 | 29.6 |
| Neopentyl glycol | 229.0 | — | 114.5 |
| 1,4-Butanediol | 98.0 | — | — |
| 1,6-Hexanediol | — | 130.0 | 130.0 |
| Ethylene glycol | — | 68.0 | — |

The adhesive compositions described above appeared similar to the novel compositions typical of this invention wherein a single glycol was employed. Sample No. VII had a melting point of 150°C., and those of samples Nos. VIII and IX were 90° and 62°C., respectively. In addition to such extremely low melting points, these adhesive compositions exhibited low melt viscosity, good heat stability, and adhesive properties comparable to those of the previously described novel compositions, when tested according to the various methods utilized in Example I.

Summarizing, it is thus seen that this invention provides novel, copolyester hot melt adhesives characterized by their low melting points and in particular, their low melt viscosities and unusually great resistance to thermal degradation, due to the presence of phthalate groups derived from phthalic acid or its anhydride. These economically produced compositions are readily adaptable to a wide variety of industrial and other type operations wherein hot-melt adhesives are called for.

It will be understood that variations in the proportions of the dicarboxylic acid functioning components and the glycols may be made without departing from the scope and spirit of this invention, which is limited only by the following claims:

What is claimed is:

1. A hot melt adhesive copolyester derived from the reaction of a mixture consisting essentially of:
   A. at least one aliphatic primary glycol having from 2-6 carbon atoms and
   B. a mixture totaling 100 mole per cent of the following dicarboxylic acids or their dicarboxylic acid functioning derivatives: 25-65 mole per cent of terephthalic acid, 25-65 mole per cent of isophthalic acid, and 5-20 mole per cent of phthalic acid; said glycol component A being chosen such that any copolyester obtained has a melting point no greater than 150°C.

2. The hot melt adhesive copolyester of claim 1 wherein said component A is 1,4-butanediol and said component B comprises from 30-50 mole per cent of terephthalic acid, from 30-50 mole per cent of isophthalic acid, and from 5-15 mole per cent of phthalic anhydride.

3. The hot melt adhesive copolyester of claim 1 wherein said component A is 1,6-hexanediol and said component B comprises 30-50 mole per cent of terephthalic acid, from 30-50 mole per cent of isophthalic acid, and from 5-15 mole per cent of phthalic anhydride.

4. The hot melt adhesive copolyester of claim 1 wherein said component A is an equimolar mixture of 1,6-hexanediol and ethylene glycol and said component B comprises from 30-50 mole per cent of terephthalic acid, from 30-50 mole per cent of isophthalic acid, and from 5-15 mole per cent of phthalic anhydride.

5. The hot melt adhesive copolyester of claim 1 wherein said component A is an equimolar mixture of 1,6-hexanediol and neopenytl glycol and said component B comprises from 30-50 mole per cent of terephthalic acid, from 30-50 mole per cent of isophthalic acid, and from 5-15 mole per cent of phthalic anhydride.

* * * * *